(12) United States Patent
Shiraishi (10) Patent No.: US 12,219,103 B2
(45) Date of Patent: Feb. 4, 2025

(54) IMAGE PROCESSING APPARATUS, CONTROL METHOD, AND NON-TRANSITORY COMPUTER-READABLE STORAGE MEDIUM COMPRISING DISPLAYING A SCANNED IMAGE WITH AN ILLUSTRATION REPRESENTING ONE SHEET OR A PLURALITY OF SHEETS

(71) Applicant: CANON KABUSHIKI KAISHA, Tokyo (JP)

(72) Inventor: Kenichi Shiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/506,580

(22) Filed: Nov. 10, 2023

(65) Prior Publication Data
US 2024/0163382 A1 May 16, 2024

(30) Foreign Application Priority Data
Nov. 14, 2022 (JP) .................. 2022-181541

(51) Int. Cl.
*H04N 1/00* (2006.01)
*G06F 3/12* (2006.01)

(52) U.S. Cl.
CPC ..... *H04N 1/00456* (2013.01); *H04N 1/00824* (2013.01)

(58) Field of Classification Search
CPC ........... H04N 1/00456; H04N 1/00458; H04N 1/00824

USPC ....................... 358/1.11–1.18, 1.1
See application file for complete search history.

(56) References Cited

U.S. PATENT DOCUMENTS

| | | | |
|---|---|---|---|
| 2011/0317195 A1* | 12/2011 | Mitsui .................. | G03G 15/502 358/1.13 |
| 2012/0050800 A1* | 3/2012 | Maruyama ......... | H04N 1/00458 358/1.15 |
| 2018/0239289 A1* | 8/2018 | Takada ............... | H04N 1/00612 |

FOREIGN PATENT DOCUMENTS

JP         2021108408 A      7/2021

* cited by examiner

*Primary Examiner* — Chad Dickerson
(74) *Attorney, Agent, or Firm* — Canon U.S.A., Inc. IP Division (57) ABSTRACT

An image processing apparatus includes one or more memories storing instructions, and one or more processors executing the instructions to display a preview screen on which, among image data of a plurality of pages of a document obtained by scanning the document, image data of a first page is displayed as image data to be edited, and an image corresponding to one or more subsequent pages after the first page is further displayed. In a case where a number of the one or more subsequent pages after the first page is one, a first image is displayed as the image corresponding to the one or more subsequent pages, and in a case where the number of the one or more subsequent pages after the first page is plural, a second image is displayed as the image corresponding to the one or more subsequent pages.

10 Claims, 9 Drawing Sheets

IMAGE PROCESSING APPARATUS, CONTROL METHOD, AND NON-TRANSITORY COMPUTER-READABLE STORAGE MEDIUM COMPRISING DISPLAYING A SCANNED IMAGE WITH AN ILLUSTRATION REPRESENTING ONE SHEET OR A PLURALITY OF SHEETS

BACKGROUND

Field of the Disclosure

The present disclosure relates to an image processing apparatus, a control method, and a storage medium for displaying a preview screen of a scanned image.

Description of the Related Art

There is known a conventional technique of, in scanning of a document using an image processing apparatus such as a multifunction peripheral, displaying image data obtained by the scanning on a preview screen on an operation panel of the image processing apparatus, and then receiving an operation of editing the image data. For example, Japanese Patent Application Laid-Open No. 2021-108408 discusses a technique of displaying, on a preview screen, image data obtained by a scan and then receiving an instruction to perform masking processing on the image data from a user.

With the technique discussed in Japanese Patent Application Laid-Open No. 2021-108408, only the image data corresponding to one page is displayed on the preview screen. In this case, it is difficult for the user to recognize whether there are other pages before and after the page displayed on the preview screen.

SUMMARY

According to an aspect of the present disclosure, an image processing apparatus includes one or more memories storing instructions, and one or more processors executing the instructions to display a preview screen on which, among image data of a plurality of pages of a document obtained by scanning the document, image data of a first page is displayed as image data to be edited, and an image corresponding to one or more subsequent pages after the first page is further displayed. In a case where a number of the one or more subsequent pages after the first page is one, a first image is displayed as the image corresponding to the one or more subsequent pages after the first page, and in a case where the number of the one or more subsequent pages after the first page is plural, a second image is displayed as the image corresponding to the one or more subsequent pages after the first page.

Further features of the present disclosure will become apparent from the following description of exemplary embodiments with reference to the attached drawings.

DESCRIPTION OF THE EMBODIMENTS

An exemplary embodiment of the present disclosure will be described below with reference to the drawings.

Figure 1:
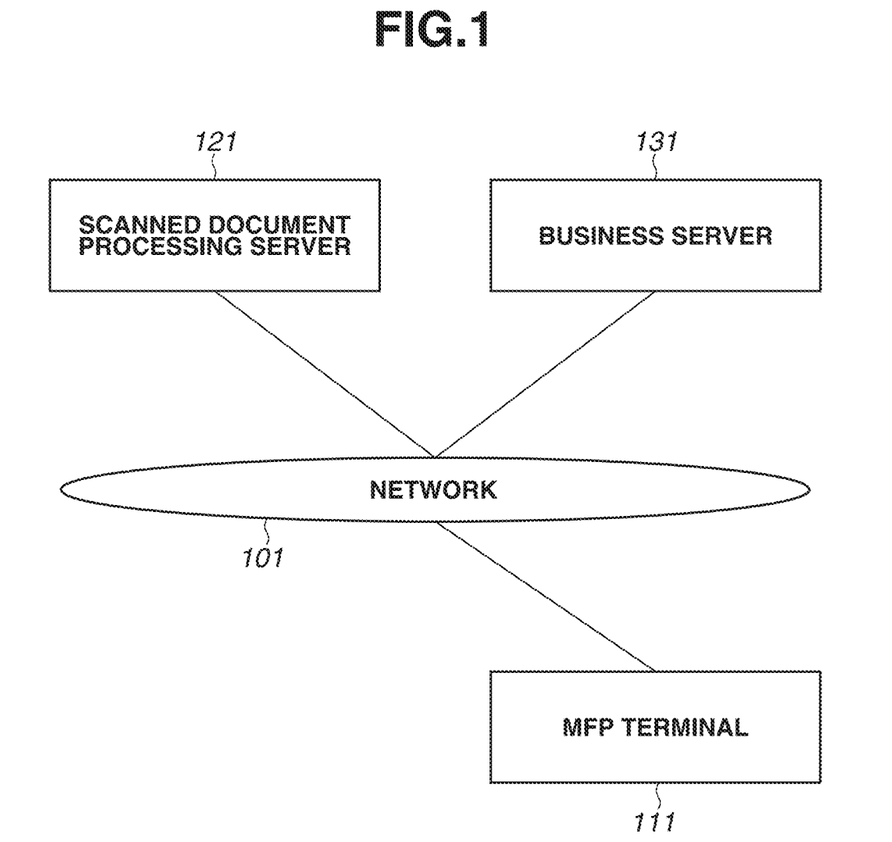
FIG. 1 is a diagram illustrating a configuration of a system and a configuration of a network according to one or more aspects of the present disclosure.

FIG. 1 illustrates an example of a configuration of a system and a configuration of a network according to the present exemplary embodiment.

A network 101 includes the Internet and an intranet. A multifunction peripheral (MFP) terminal 111 is an example of an image processing apparatus, such as an MFP having a plurality of functions including a scanner function and a printer function. A scanned document processing server 121 is an example of a service having functions of storing an image file scanned by the MFP 111 into its own server, and transferring the image file to a service, such as a business server 131 (described below), which can store files. The business server 131 is assumed to be a service, such as a cloud storage, having a function of using or managing files and documents, but may be a business application. The business server 131 may take the form of on-premise. For example, the business server 131 may be replaced with a mail server or the like, and a scanned image may be transmitted while being attached to an e-mail.

Figure 2:
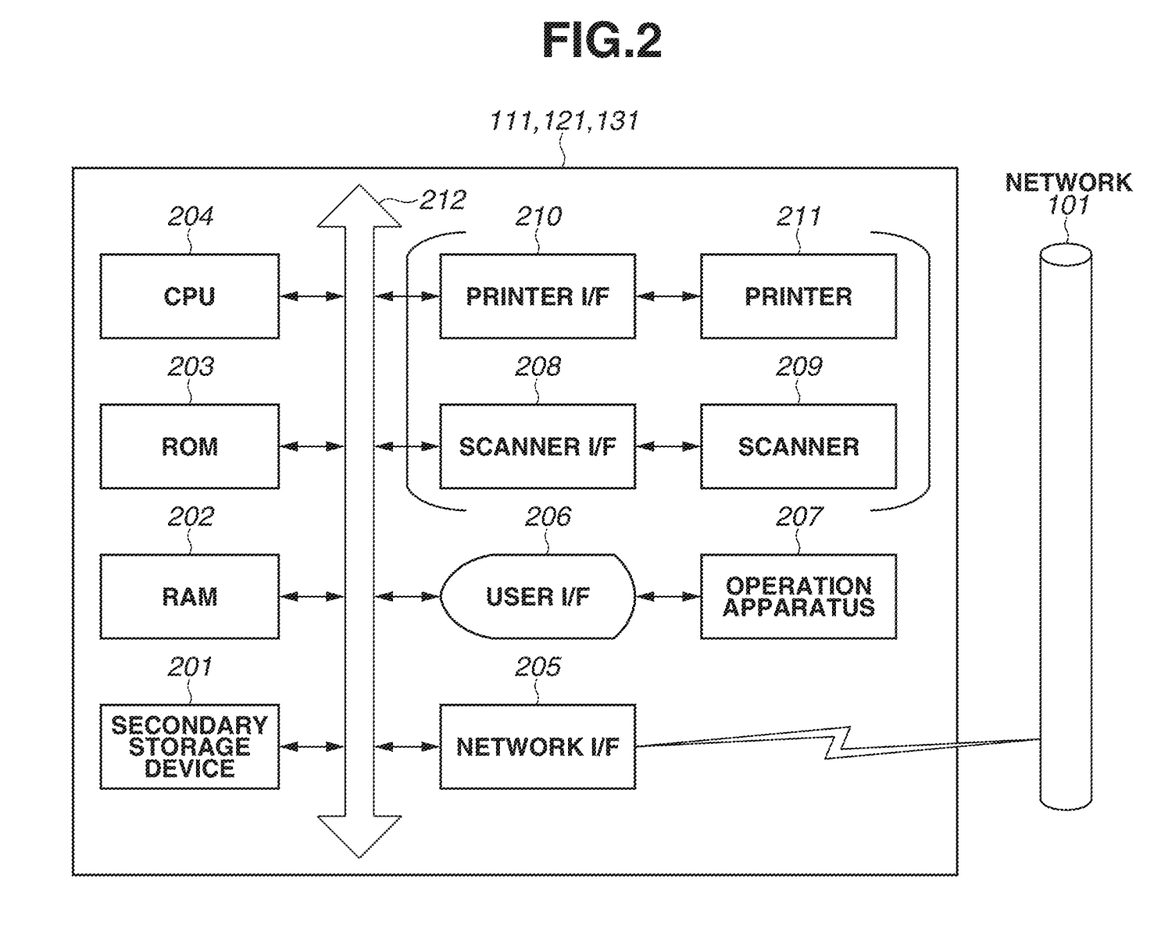
FIG. 2 is a hardware configuration diagram illustrating information processing functions.

FIG. 2 is a module configuration diagram illustrating information processing functions of each of the MFP terminal 111, the scanned document processing server 121, and the business server 131. A secondary storage device 201 is typically a hard disk drive (HDD) or a flash memory. A random access memory (RAM) 202 serves as a temporary memory area. A read only memory (ROM) 203 stores embedded programs and data. A central processing unit (CPU) 204 executes programs read from the secondary storage device 201, the RAM 202, the ROM 203, and the like. A network interface (I/F) 205 is connected to the network 101, such as a local area network (LAN), and communicates with another computer, an MFP, a printer, a network apparatus, and an external service. Any of a wired communication method and a wireless communication method is usable. A user I/F 206 is interposed to control input and output of an operation apparatus 207 including, for example, a display, a keyboard, a mouse, buttons, and a touch panel. A computer not including these hardware components can be connected and operated from another computer, using a remote desktop, a remote shell, or the like. A scanner I/F 208 and a printer I/F 210 are included in the MFP terminal 111 to control input and output of external apparatuses, such as a scanner 209 and a printer 211. The processing units are configured to mutually exchange data via a system bus 212.

Figure 3:
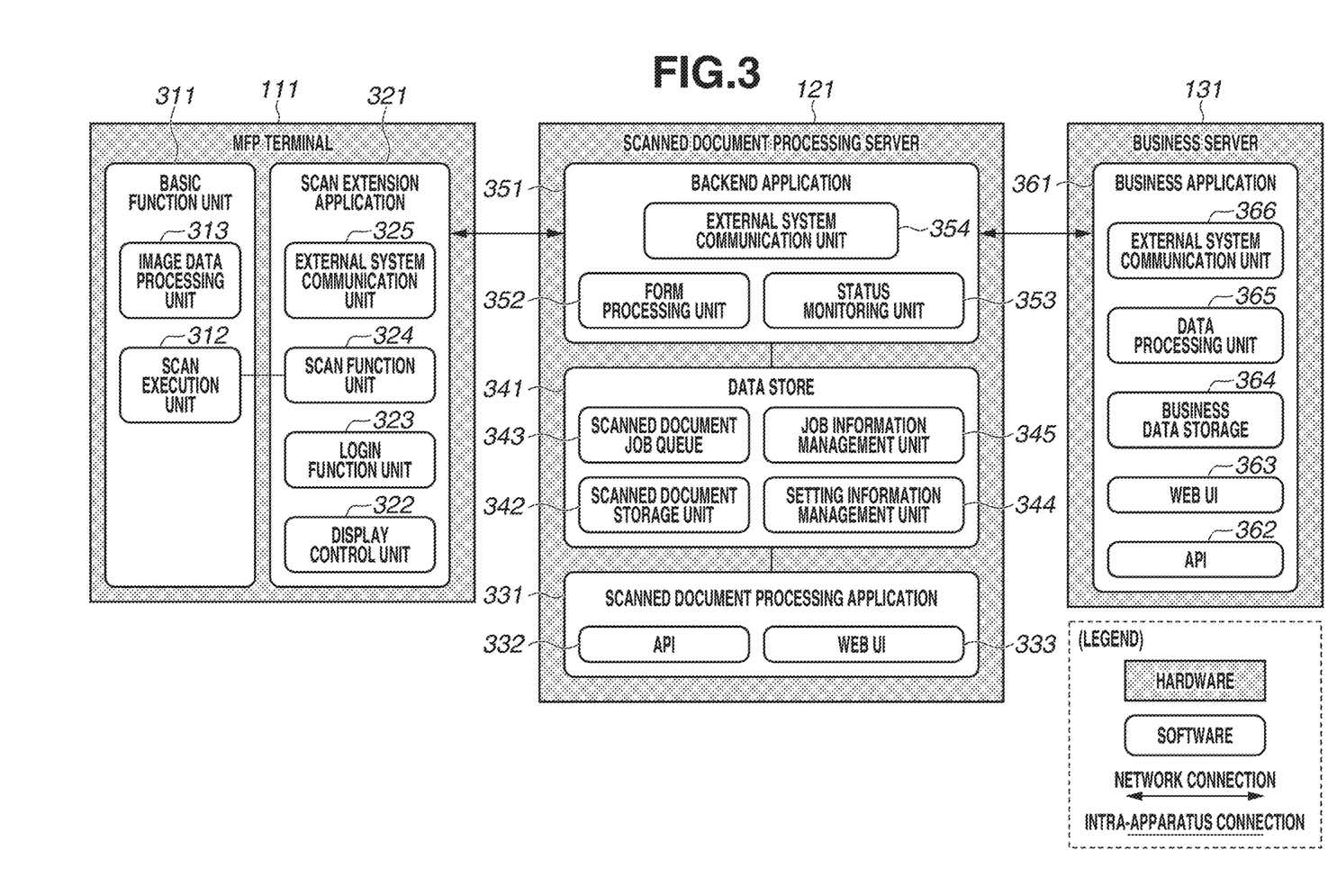
FIG. 3 is a block diagram illustrating a software configuration and a hardware configuration of the system.

FIG. 3 is a block diagram illustrating a software configuration of the system. A plurality of pieces of software installed on each piece of the hardware is executed by the CPU 204, and mutually communicable as indicated by double arrows that represent network connections.

The MFP terminal 111 includes a basic function unit 311 and a scan extension application 321. The basic function unit 311 is a standard function provided in the MFP terminal 111. The scan extension application 321 is additionally installed on the MFP terminal 111 in order to implement functions provided by the basic function unit 311. The scan extension application 321 is a Java®-based application, and enables easy addition of functions to the MFP terminal 111. In the present exemplary embodiment, to simplify the description, the scan extension application 321 has both of a login function and a scan function, and controls screen display and issues requests to the scanned document processing server 121. Alternatively, the functions may be implemented by a plurality of applications. For example, the scan extension application 321 may be divided into two applications, or another application may be additionally installed to cooperate with the scan extension application 321.

The basic function unit 311 includes a scan execution unit 312 and an image data processing unit 313.

The scan extension application 321 includes a display control unit 322, a login function unit 323, a scan function unit 324, and an external system communication unit 325.

The display control unit 322 displays user interface (UI) screens for receiving operations performed by a user on the operation apparatus 207 via the user OF 206 of the MFP terminal 111. For example, the display control unit 322 displays the UI screens for inputting authentication information in order to access the scanned document processing server 121, making scan settings, performing a scan start operation, and displaying a preview screen, and then receives inputs on the UI screens.

The login function unit 323 stores login information for the MFP terminal 111 and login information for the scanned document processing server 121 in association with each other. The login function unit 323 sets the authentication information to acquire setting information from the scanned document processing server 121 on the MFP terminal 111 and to transmit to the scanned document processing server 121 a processing request for transmitting image data.

The scan function unit 324 requests the scan execution unit 312 to perform scan processing based on a scan instruction issued by the user on the UI screen.

The scan execution unit 312 receives, from the scan function unit 324, the scan request including the scan settings. Based on the scan request, the scan execution unit 312 causes the scanner 209 to scan a document placed on a platen glass via the scanner OF 208, thereby generating scanned image data. The generated scanned image data is transmitted to the image data processing unit 313. The scanned image data is assumed to be an image file in a format of Joint Photographic Experts Group (JPEG), portable document format (PDF), or the like. The scan execution unit 312 returns, to the scan function unit 324, a scan image identifier uniquely indicating the scanned image data stored in the secondary storage device 201. The scan image identifier is a number, a symbol, an alphabet, or the like (not illustrated) for uniquely identifying the scanned image data generated by the MFP terminal 111. The image data processing unit 313 stores the scanned image data received from the scan execution unit 312, into the secondary storage device 201.

The scan function unit 324 acquires the scanned image data corresponding to the scan image identifier received from the scan execution unit 312, from the secondary storage device 201 via the image data processing unit 313. The scan function unit 324 requests the external system communication unit 325 to instruct the scanned document processing server 121 to perform processing on the acquired scanned image data. User information used in this request is based on information about the user having logging in via the login function unit 323.

The external system communication unit 325 requests the scanned document processing server 121 to perform various kinds of processing, and analyzes the response of the processing result. For example, the external system communication unit 325 transmits processing requests to perform login processing, perform processing on the scanned image data, and perform authentication and transmission of the image data to the business server 131 (described below), and then analyzes the response of the processing result. In the present exemplary embodiment, communication with the scanned document processing server 121 is performed using a protocol, such as Representational State Transfer (REST) or Simple Object Access Protocol (SOAP), but other communication methods can be used.

A scanned document processing application 331 is installed on the scanned document processing server 121. In the present exemplary embodiment, the scanned document processing server 121 is described to operate as a web application server, but may install applications thereon.

An application programming interface (API) 332 is provided by the scanned document processing application 331.

A web UI 333 is provided by the scanned document processing application 331.

A data store 341 saves and stores data used by the scanned document processing application 331 or a backend application 351 (described below). The data store 341 stores various kinds of data to be described next.

A scanned document storage unit 342 stores, as a document file, the scanned image data received via an external system communication unit 354 (described below) from the MFP terminal 111.

A scanned document job queue 343 holds a queue for managing jobs to be processed. A job is the minimum execution unit of document processing requested from the MFP terminal 111. While in the present exemplary embodiment, a single queue is described for simplification of the description, a plurality of queues may be provided based on priorities of schedules of the jobs and processing contents thereof.

A setting information management unit 344 manages setting information for use in scanning and account information for use in cooperation with the scanned document processing server 121 and the business server 131, in association with the user. The setting information management unit 344 also manages the overall setting of the scanned document processing server 121.

A job information management unit 345 manages detailed information, such as a processing state, a registration date, and applied setting information, for each of the jobs.

The backend application 351 performs background processing. The backend application 351 performs the processing to be described next.

A form processing unit 352 controls the jobs in the data store 341, and performs form processing on scanned documents. Examples of the form processing include acquisition of an input image from the scanned document storage unit 342, optical character recognition (OCR), division, conversion, form determination processing such as pattern recognition and machine learning, text data extraction processing, and rotation, deletion, and insertion of a specific page.

A status monitoring unit 353 checks processing states and load states of the jobs, the scanned document processing server 121, and the business server 131, and performs processing corresponding to each of the states.

The external system communication unit 354 performs processing relating to transmission and reception of the scanned image data transmitted from the MFP terminal 111, requests for various kinds of processing, and response results of the requests, and processing relating to transmission and reception of requests made to the business server 131 (described below) for various kinds of processing and response results of the requests. Examples of the various kinds of processing for which the requests are made to the business server 131 include authentication from the MFP terminal 111 or the scanned document processing server 121, transmission of the scanned image data, and acquisition of various kinds of information managed by the business server 131. In the present exemplary embodiment, communication with the business server 131 is performed using a protocol, such as REST or SOAP, but other communication methods can be used.

A business application 361 is executed by the business server 131.

An API 362 is provided by the business application 361.

A web UI 363 is provided by the business application 361.

A business data storage 364 stores data used by the business application 361.

A data processing unit 365 performs processing requested by the user via the MFP terminal 111 and the scanned document processing server 121, using information about files and folders stored in the business data storage 364.

An external system communication unit 366 performs processing relating to transmission and reception, such as analyzing a request received from the scanned document processing server 121 and transmitting a processing result as a response.

For simplification of the description, the form and configuration of the business server 131 are integrated into one application. However, as with the scanned document processing server 121, the business server 131 may be provided using a form and a configuration in which a system or an application is divided into parts, such as a backend application and a data store, based on the functions.

To transmit, process, and store the results of the processing performed by the scanned document processing server 121, one or more business servers 131 are assumed to cooperate with the scanned document processing server 121.

Subsequently, a screen displayed on the operation apparatus 207 of the MFP terminal 111 according to the present exemplary embodiment will be described with reference to FIGS. 4A to 4F. FIGS. 4A to 4F each illustrate the screen according to the present exemplary embodiment. More specifically, FIGS. 4A to 4F illustrate examples of a preview screen displayed on the operation apparatus 207, including a touch panel, by the display control unit 322 of the scan extension application 321 via the user I/F 206.

Figure 4A:
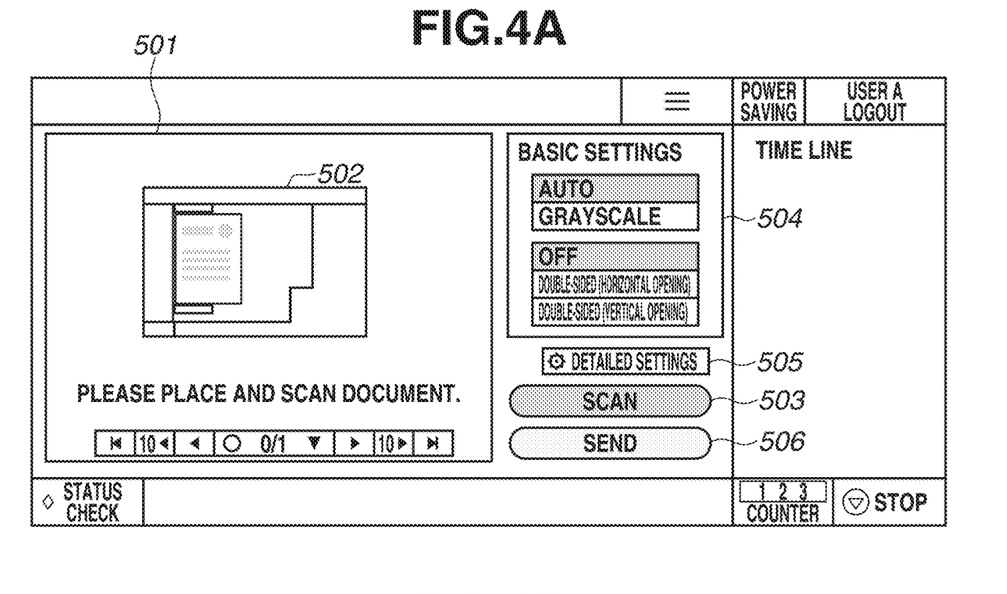
FIGS. 4A to 4F are diagrams illustrating examples of a preview screen according to one or more aspects of the present disclosure.

FIG. 4A illustrates a screen displayed on the operation apparatus 207 by the display control unit 322 after the scan function is started based on a user's instruction. In a case where a document has not yet been scanned, an image 502 and a message for prompting the user to perform a scan are displayed in a preview area 501.

Figure 4B:
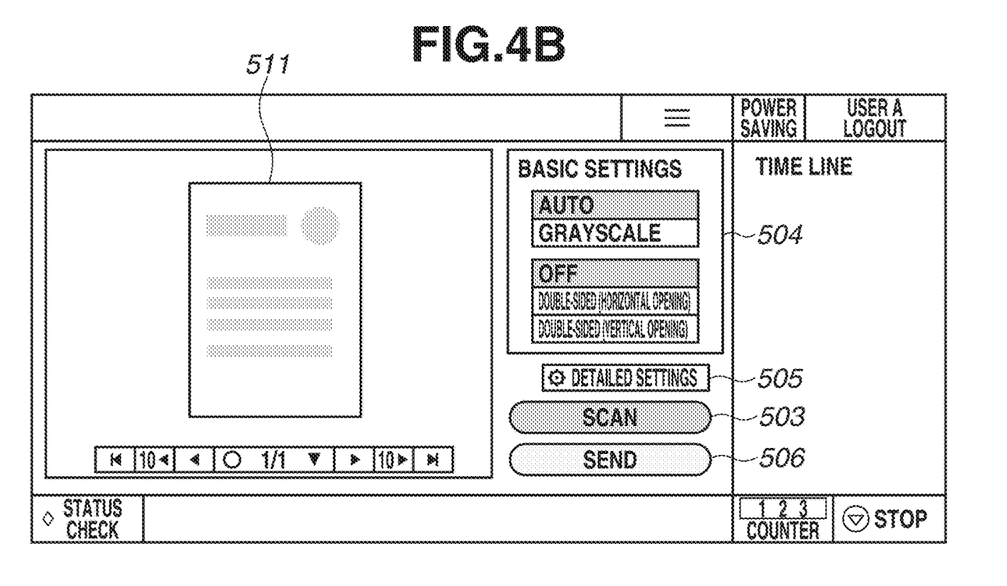

The user places one sheet of a document on the scanner 209, and presses a button 503 for performing a scan on the screen illustrated in FIG. 4A. Upon detecting the pressing of the button 503, the display control unit 322 displays a fixed image 511 corresponding to one sheet in the preview area 501 as illustrated in FIG. 4B. The fixed image 511 serves as a substitute for the scanned image data. Meanwhile, upon scanning the document placed on the scanner 209, the scan execution unit 312 of the basic function unit 311 transmits the data obtained by the scan to the image data processing unit 313. Upon receiving the data obtained by the scan, the image data processing unit 313 generates image data to be displayed in the preview area 501 of the preview screen illustrated in FIG. 4A. Processing for generating the image data is referred to as imaging processing. Returning to the description of the preview screen, the fixed image 511 corresponding to one sheet displayed in the preview area 501 is displayed until the imaging processing on the scanned image data of one sheet of the document is completed. The fixed image 511 displayed in the preview area 501 is stored in advance in the secondary storage device 201. Alternatively, the fixed image 511 may be stored at the same time when the scan extension application 321 is installed. The fixed image 511 may be provided not in an image format but in a format, such as cascading style sheets (CSS), in which program elements are designed and defined.

Upon completion of the imaging processing, the display control unit 322 receives the image data on which the imaging processing has been completed. The display control unit 322 displays the received image data (image data 521 in FIG. 4C) in the preview area 501 in place of the fixed image 511 corresponding to one sheet. Displaying the image data of the scanned document in the preview area 501 enables the user to check the image data of the scanned document. The user can also edit the image data in the preview area 501. Details thereof will be described below with reference to FIG. 4F.

Figure 4C:
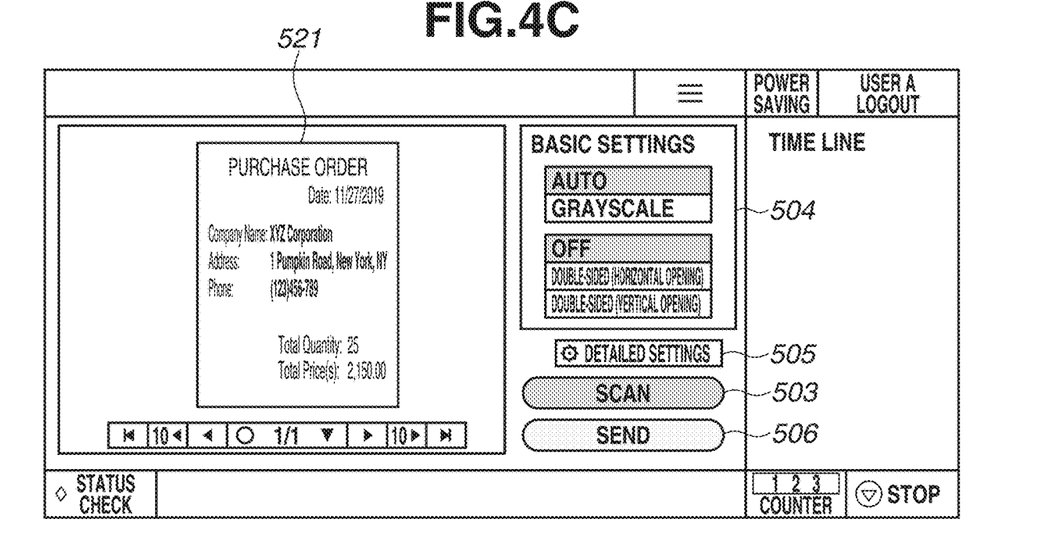
Figure 4D:
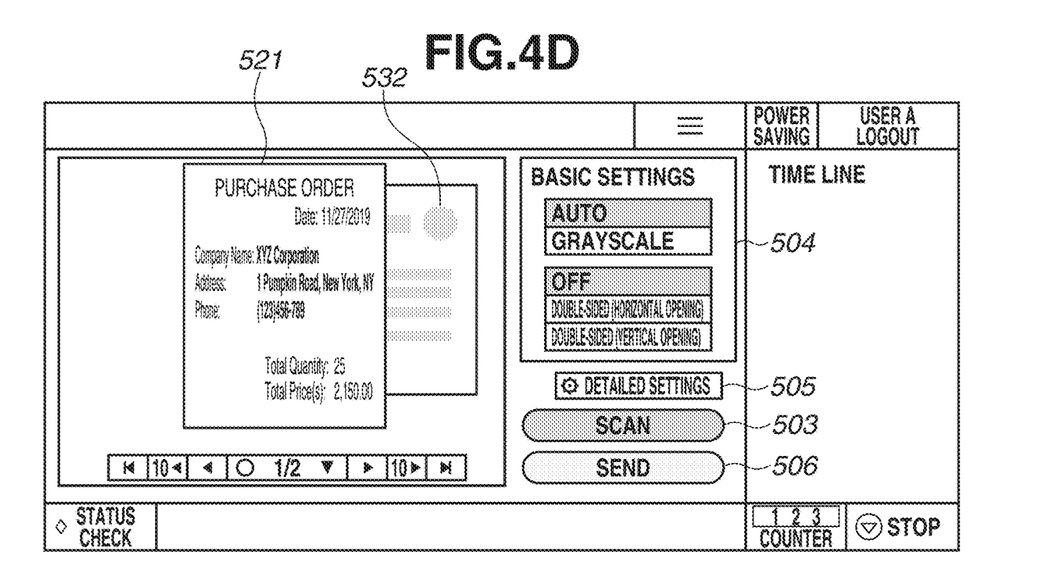

A case will be considered where the user places a second sheet of the document on the scanner 209, and presses the button 503 on the screen on which the image data 521 is displayed as illustrated in FIG. 4C. In other words, a case will be considered where the user issues an instruction to perform an additional scan. Upon detecting the pressing of the button 503 on the screen, the display control unit 322 displays a fixed image 532 corresponding to one sheet on a right side of the image data 521 displayed in the preview area 501, as illustrated in FIG. 4D. Meanwhile, upon scanning the document placed on the scanner 209, the scan execution unit 312 of the basic function unit 311 transmits the data obtained by the scan to the image data processing unit 313. Upon receiving the data obtained by the scan, the image data processing unit 313 performs the above-described imaging processing. The image data on which the imaging processing has been completed is displayed in the preview area 501 only in a case where the user selects this image data as the image data to be checked, based on a page change instruction (described below) issued by the user on the preview screen.

Figure 4E:
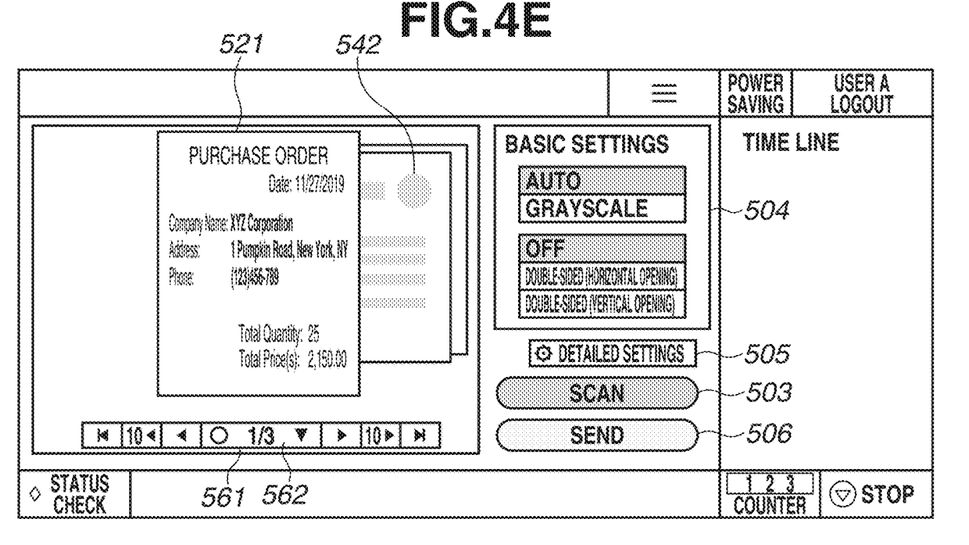

A case will be considered where the user places a third sheet of the document on the scanner 209, and presses the button 503 on the screen on which the image data 521 and the fixed image 532 corresponding to one sheet are displayed as illustrated in FIG. 4D. In other words, a case will be considered where the user issues an instruction to perform a second additional scan. Upon detecting the pressing of the button 503 on the screen, the display control unit 322 displays a fixed image 542 corresponding to a plurality of sheets in place of the fixed image 532 corresponding to one sheet displayed in the preview area 501, as illustrated in FIG. 4E. Meanwhile, the basic function unit 311 performs the imaging processing in a manner similar to the above-described processing. Similarly to the image data of the second sheet, the image data of the third sheet on which the imaging processing has been completed is displayed in the preview area 501 only in a case where the user selects this image data as the image data to be checked, based on the page change instruction issued by the user.

On the screen illustrated in FIG. 4E, a fourth sheet of the document can be placed and an instruction to perform a third additional scan can be issued. The scan processing is similar to the second additional scan. However, even when the display control unit 322 detects the pressing of the button 503 on the screen, the display of the fixed image 542 corresponding to the plurality of sheets on the right side of the image data 521 in the preview area 501 remains unchanged. The fixed image 542 corresponding to the plurality of sheets is continuously displayed in the state illustrated in FIG. 4E.

As described above, in the present exemplary embodiment, the display control unit 322 displays the preview screen by using two types of fixed images, namely, the fixed image corresponding to one sheet and the fixed image corresponding to the plurality of sheets. However, the display is not limited thereto. For example, after the issue of the instruction to perform the third additional scan, a fixed image 711 (see FIG. 7) corresponding to three sheets may be displayed in place of the fixed image 542 corresponding to the plurality of sheets.

In the preview area 501, the image data of a page to be edited, which is currently checked by the user, is displayed at the center. The user can change the page to be checked, using right arrow buttons 563, 564, 565, and left arrow buttons. The reference numerals thereof are indicated only in FIG. 4F, but these arrow buttons are similarly displayed on the screens in FIGS. 4A to 4E. A case will now be considered where the user performs an additional scan ten times in total and the number of pages of the image data is 11. If the user performs the additional scan ten times without operating a control 561 in the preview area 501, the fixed image 542 corresponding to the plurality of sheets is continuously displayed in the state illustrated in FIG. 4E. A difference from the screen illustrated in FIG. 4E in this case is that a page number 562 of the page currently being checked is displayed as "1/11". A case will be considered where the user presses the right arrow button 563 once in this state. Upon detecting one pressing of the right arrow button 563 by the user, the display control unit 322 displays image data 551 of the second sheet in place of the image data 521 of the first sheet displayed in the preview area 501. Further, a fixed image 553 corresponding to one sheet is displayed on a left side of the image data 551 of the second sheet. The fixed image 553 corresponding to one sheet is displayed to notify the user that the image data 521 of the first sheet is present before the image data 551 of the second sheet. The fixed image 542 corresponding to the plurality of sheets displayed on the right side of the image data 521 is continuously displayed in a case where the display of the image data 521 is changed to the display of the image data 551 but the image data of two or more sheets is still present after the image data 551. The display control unit 322 changes the page number 562 of the page currently being checked to "2/11".

Although not illustrated, a case where the user further performs page change and the page number 562 of the page currently being checked is changed to "3/11" will be considered. In this case, the display control unit 322 changes the display of the fixed image 553 corresponding to one sheet displayed on the left side of the image data 551 of the page currently being checked, to display of a fixed image corresponding to a plurality of sheets. If the user further performs page change and the page number 562 of the page currently being checked is changed to "10/11", the display control unit 322 changes the display of the fixed image 542 corresponding to the plurality of sheets displayed on the right side of the image data of the page currently being checked, to the display of the fixed image 532 corresponding to one sheet.

In a case where the image data on which the imaging processing has not been completed is selected as the image data to be displayed at the center of the preview area 501, based on the page change instruction issued by the user, a fixed image corresponding to one sheet is temporarily displayed at the center as the image of the page currently being checked. Then, based on the completion of the imaging processing, the display of the fixed image corresponding to one sheet displayed at the center is changed to the display of the image data on which the imaging processing has been completed.

The control 561 that is displayed in the preview area 501 and used by the user to issue the page change instruction will now be described. The page number 562 indicates the page number of the page currently being checked by the user. The display control unit 322 displays the total number of pages of the scanned image data and the page number of the image data displayed at the center of the preview area 501. The right arrow buttons 563 to 565 are used to perform page change, more specifically, to issue instructions to go to the next page, jump ten pages forward, and go to the last page, respectively. Likewise, buttons for issuing instructions to go to the previous page, jump ten pages back, and go to the top page are also displayed in the control 561.

A control 571 used by the user to issue an instruction to edit the image data of the page currently being checked, such as the image data 521 or the image data 551, will be described. Upon detecting the pressing of the page number 562 of the page currently being checked, the display control unit 322 displays the control 571. Alternatively, the control 571 may be displayed using a different method. For example, a dedicated button to open the control 571 may be provided and the control 571 may be opened in response to selection of the dedicated button. Upon detecting the pressing of the page number 562 of the page currently being checked in any of the screens in FIGS. 4A to 4E, the display control unit 322 displays the control 571 as in FIG. 4F.

Buttons 572, 573, and 574 are examples of an editing function processible by the scan extension application 321, and are respectively used to issue instructions to perform left rotation processing, right rotation processing, and deletion processing on the image data of the page currently being checked. In addition, for example, a button for issuing an instruction to perform processing, such as insertion or inversion of a desired page, or conversion processing may be displayed. Upon detecting the pressing of the button 572 (the left rotation button) on the screen illustrated in FIG. 4F, the display control unit 322 rotates the image data 551 leftward by 90 degrees, and displays the rotated image data like image data 601 illustrated in FIG. 5A.

In the case of the MFP terminal 111 including an automatic document feeder (ADF), a plurality of sheets of a document can be scanned based on a single scan instruction. Also in this case, the display control unit 322 displays the preview screen described with reference to FIGS. 4A to 4F so that, for example, for the scanned image data of the second sheet, the fixed image 532 corresponding to one sheet is additionally displayed on the right side of the fixed image 511 or the image data 521, which corresponds to the page currently being checked.

Figure 6:
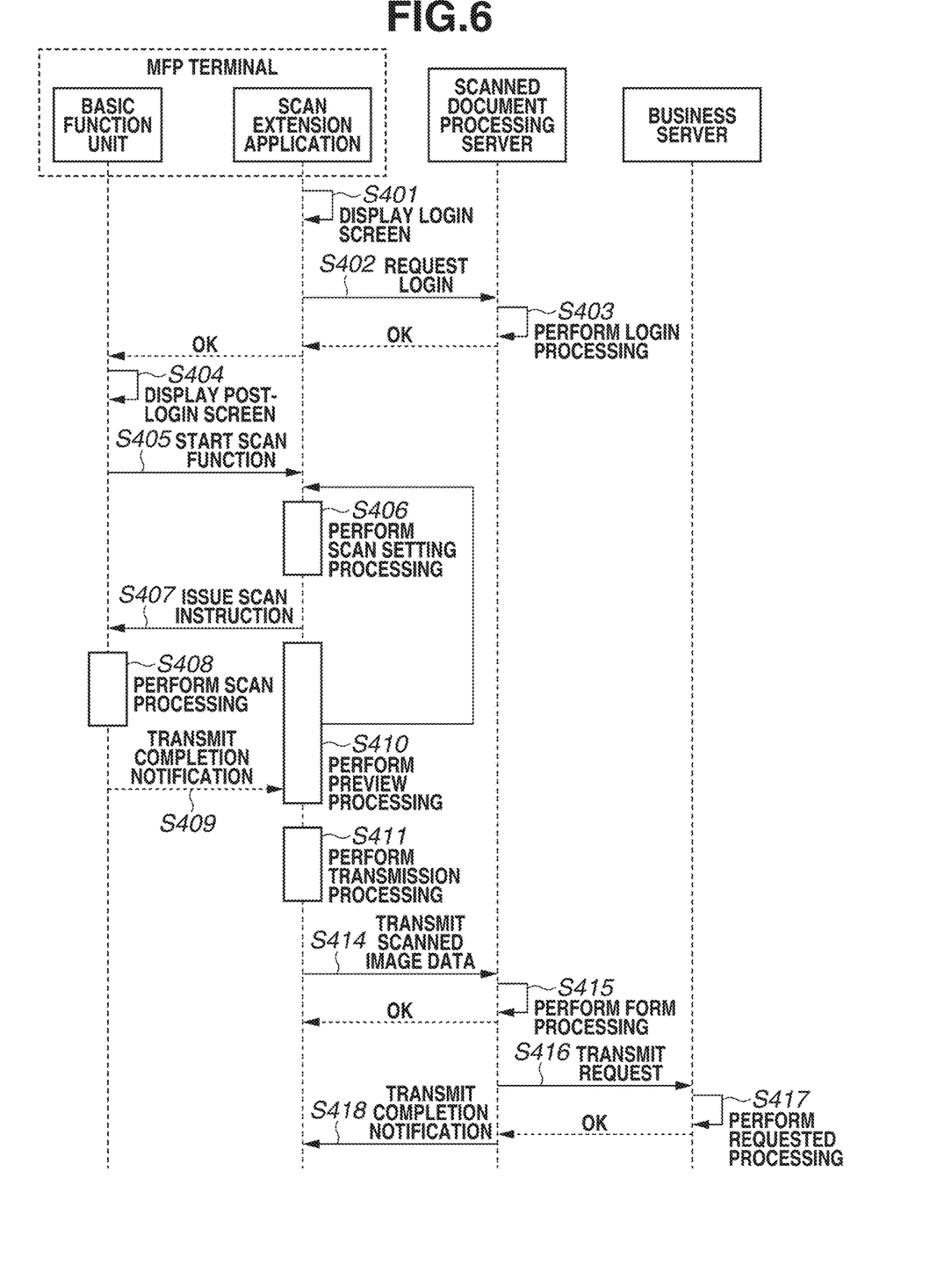
FIG. 6 is a sequence diagram of processing among apparatuses according to one or more aspects of the present disclosure.

A sequence among the MFP terminal 111, the scanned document processing server 121, and the business server 131, which illustrates a series of processing from device login to preview display and image data transmission according to the present exemplary embodiment, will be described with reference to FIG. 6. The processing illustrated in FIG. 6 is controlled based on the programs.

To simplify the description, it is assumed that the input from the user and the output of the screen to be presented to the user from the scan extension application 321 correspond to operations performed using, for example, a touch panel by the display control unit 322 via the user I/F.

In step S401, when the MFP terminal 111 activates the scan function unit 324 of the scan extension application 321 based on an instruction from the user, the scan extension application 321 presents a login screen to the user and receives an operation for login.

The user enters information (e.g., an identifier (ID), a password, and a personal identification number associated with the user information) for logging in the scanned document processing server 121. Any login method can be used at this time. For example, login information may be stored in advance in the MFP terminal 111, and the login information for the MFP terminal 111 itself may be associated with the user information in the scanned document processing server 121.

In step S402, based on the entered information, the scan extension application 321 requests the backend application 351 of the scanned document processing server 121 to perform login processing via the external system communication unit 325.

In step S403, the backend application 351 of the scanned document processing server 121 analyzes the request received via the external system communication unit 354, by collating the request with the information associated with the user information stored in the setting information management unit 344. The backend application 351 then returns a response result of the request to the scan extension application 321.

In step S404, after successful connection with the scanned document processing server 121, the login function unit 323 of the scan extension application 321 notifies the basic function unit 311 about the successful connection, and the basic function unit 311 displays a post-login screen.

In step S405, the basic function unit 311 starts the scan function of the scan extension application 321 based on a selection operation performed by the user on the post-login screen.

In step S406, the scan extension application 321 performs scan setting processing. The scan setting processing will be specifically described. In the present example, a case will be described where one sheet of a document is to be scanned in a state where no document has been scanned. The scan function unit 324 of the scan extension application 321 displays the scan screen illustrated in FIG. 4A based on the start of the scan function, and waits for a scan execution instruction from the user. The user places a desired document on the scanner 209. The user then operates settings buttons 504 and 505 on the scan screen illustrated in FIG. 4A to perform scan settings for the document. For the scan settings, a method is assumed to be used in which the scan settings stored in the setting information management unit 344 of the scanned document processing server 121 are displayed on the scan extension application 321 together with the response result returned in the login processing in step S403, and are selected and used. However, other methods can be used. For example, the scan settings may be directly performed on the MFP terminal 111. Upon completing the settings, the user presses the button 503 to issue a scan execution instruction. Upon detecting the pressing of the button 503 to issue the scan execution instruction, the display control unit 322 transmits the scan execution instruction to the scan function unit 324. In step S407, upon receiving the scan execution instruction, the scan function unit 324 instructs the scan execution unit 312 of the basic function unit 311 to perform scan processing.

In step S408, the basic function unit 311 performs scan processing. More specifically, the scan execution unit 312 of the basic function unit 311 receives, from the scan function unit 324, a scan request including the scan settings, and scans the document placed on the scanner 209 via the scanner OF 208. The scan execution unit 312 then transmits the data of the scanned document to the image data processing unit 313. The image data processing unit 313 having received the data of the scanned document generates scanned image data to be displayed in preview processing (described below), and stores the generated scanned image data. In step S409, upon completing the generation of the scanned image data, the image data processing unit 313 transmits a completion notification to the scan extension application 321.

In step S410, the scan extension application 321 performs the preview processing asynchronously with the scan processing. In the present example, the preview processing performed in a case where one sheet of a document is scanned will be specifically described. The display control unit 322 of the scan extension application 321 detects the pressing of the button 503 in the scan setting processing in step S406. Based on the detection, the display control unit 322 displays the fixed image 511 corresponding to one sheet in the preview area 501 of the preview screen displayed on the operation apparatus 207 as with the preview screen illustrated in FIG. 4B. Upon receiving the completion notification in step S409, the display control unit 322 displays the image data generated in step S408 in the preview area 501 in place of the fixed image 511 corresponding to one page, as with the preview screen illustrated in FIG. 4C. The user can perform an editing operation on the displayed image data as appropriate by using the control 571. For example, in a case where the display control unit 322 detects the pressing of the button 572 (the left rotation button) by the user, the scan extension application 321 performs editing to rotate the image data leftward by 90 degrees. The display control unit 322 then displays the edited image data in the preview area 501. The editing operation may not necessarily be performed, and the processing may proceed to transmission processing in step S411 without editing the image data. In the present exemplary embodiment, the processing for editing the scanned image data is assumed to be performed by the scan extension application 321. Alternatively, the image data processing unit 313 of the basic function unit 311 may perform this processing. Further alternatively, an image processing scan extension application may be additionally provided to perform the processing.

During the preview processing in step S410, the user can issue an additional scan instruction. In this case, the processing returns to step S406. Specific processing performed in steps S406 and S410 in the case of a first additional scan will be described.

In step S406, scan setting processing for the first additional scan is performed. The scan setting processing at this time is partially different from the scan setting processing for scanning the first sheet described above. To scan the first sheet, the user issues the scan setting instruction on the scan screen illustrated in FIG. 4A, whereas, to perform the first additional scan, namely, to scan the second sheet, the user issues the scan setting instruction on the scan screen illustrated in FIG. 4C. The user performs the scan settings and issues the scan instruction directly on the preview screen displayed in scanning the first sheet, which is illustrated in FIG. 4C. The method used by the user to perform the scan settings and issue the scan instruction is similar to that used in scanning the first sheet. The user performs an operation using the settings buttons 504 and 505 on the screen illustrated in FIG. 4C. The processing in steps S407 to S409 is similar to the processing for scanning the first sheet.

Figure 5A:
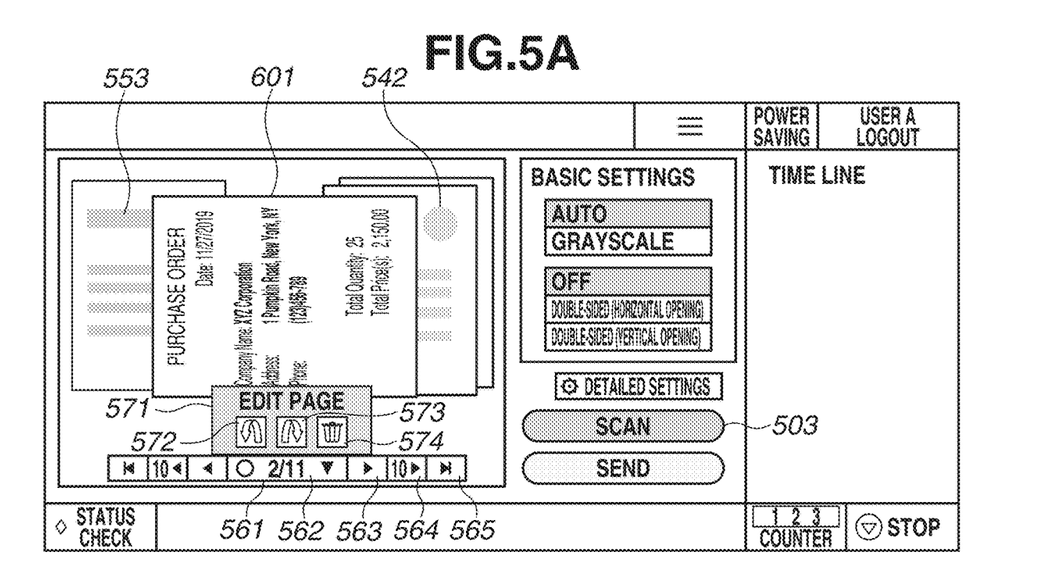
FIGS. 5A and 5B are diagrams illustrating examples of the preview screen according to one or more aspects of the present disclosure.
Figure 5B:
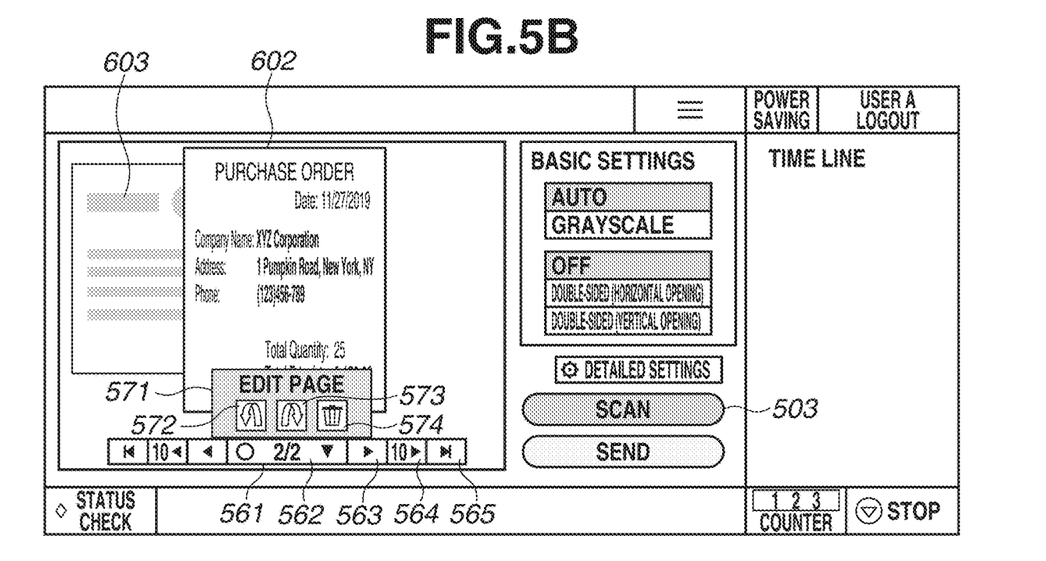

Subsequently, the scan extension application 321 performs the preview processing for the first additional scan asynchronously with the first additional scan in step S408. The preview processing at this time is also partially different from the preview processing for scanning the first sheet described above. The display control unit 322 of the scan extension application 321 detects the pressing of the button 503 in the scan setting processing in step S406. Based on the detection, the display control unit 322 displays the fixed image 532 corresponding to one sheet on the right side of the image data 521 displayed in the preview area 501, as with the preview screen illustrated in FIG. 4D. In the case of scanning the first sheet, upon receiving the completion notification in step S409, the display control unit 322 displays the image data generated in step S408 in place of the fixed image 511 corresponding to one sheet. On the other hand, in the case of the first additional scan, namely, in the case of scanning the second sheet, control to display the generated image data is not performed based on the reception of the completion notification in step S409. In the case of scanning the second sheet, the user can perform an editing operation on the image data 521 being displayed, using the control 571 as appropriate in a manner similar to the case of scanning the first sheet. In the case of scanning the second sheet, the user can also perform page change using the control 561. For example, in a case where the pressing of the right arrow button 563 by the user is detected, the display control unit 322 displays the preview area 501 as illustrated in FIG. 5B. Image data 602 is the data obtained by the additional scan, and a fixed image 603 corresponding to one sheet indicates the presence of the image data 521 of the first sheet. The user can perform an editing operation also on the image data 602 displayed after the page change in the above-described manner. The editing method is similar to the method described above. The editing operation on the image data 521 of the first sheet and the image data 602 of the second sheet may not necessarily be performed, and the processing may directly proceed to the transmission processing in step S411.

During the preview processing in step S410, the user can further issue a second additional scan instruction. In this case, the processing returns to step S406 again. The processing in steps S406 to S409 at this time is similar to the processing in the first additional scan. In step S410, the display control unit 322 displays the fixed image 542 in place of the fixed image 532 currently being displayed. The other processing in the preview processing is similar to the processing in the first additional scan.

The additional scan processing can be performed three or more times. In a third or subsequent additional scan, the processing in steps S406 to S409 is similar to the processing in the second additional scan. In step S410, the display control unit 322 continuously displays the fixed image 542 currently being displayed. The other processing in the preview processing is similar to the processing in the second additional scan.

Figure 4F:
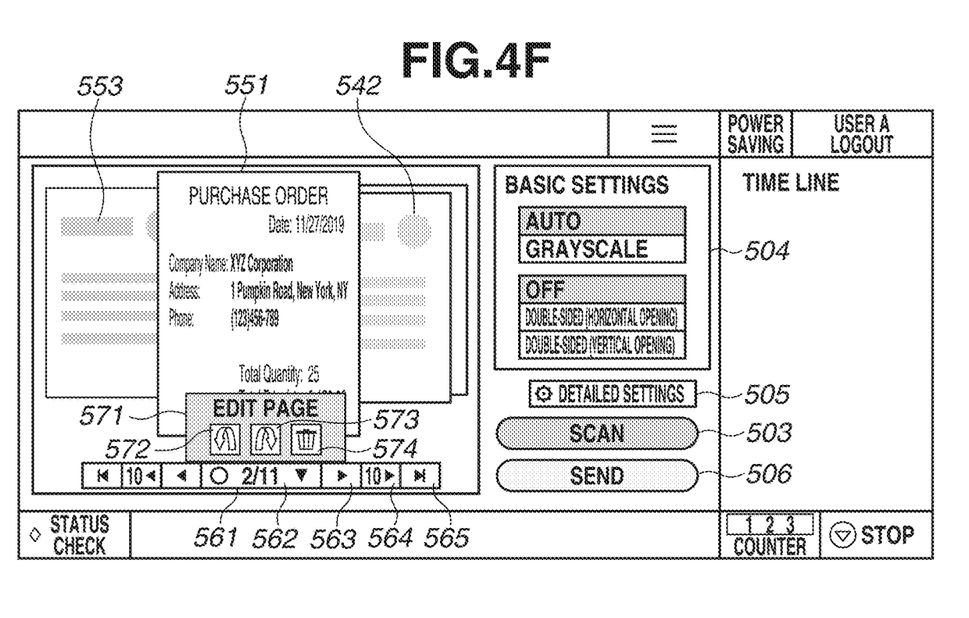

The additional scan processing can also be performed in a state where the image data other than the image data 521 of the first sheet is displayed in the preview area 501 as illustrated in FIG. 4F. Also in this case, the display is controlled to arrange the image data obtained by the additional scan at the bottom, and the image data of two or more sheets is collectively displayed like the fixed image 542 corresponding to the plurality of sheets.

Upon completion of the preview processing in step S410, the processing proceeds to the transmission processing in step S411. In step S411, the display control unit 322 receives an image data transmission instruction from the user. More specifically, the user presses a send button 506 on the preview screen illustrated in FIGS. 4A to 4F. In step S414, upon detecting the pressing of the send button 506, the display control unit 322 transmits the image data obtained by the scan or the image data edited by the user, together with a request to perform processing in the scanned document processing server 121.

In step S415, the external system communication unit 354 of the backend application 351 of the scanned document processing server 121 analyzes the processing request received from the external system communication unit 325 of the scan extension application 321. Then, the form processing unit 352 registers the request in the scanned document storage unit 342, the job information management unit 345, and the scanned document job queue 343, and the requested processing is performed in order. The processing performed at this time is the form processing, for example, OCR, division, and conversion. The scan extension application 321 receives, from the scanned document processing server 121, a result response indicating the success or failure of the transmission and a result response of the form processing.

In step S416, upon completion of the form processing, the scanned document processing server 121 causes the external system communication unit 354 to generate a request, and transmits the request to the business server 131.

In step S417, the business server 131 analyzes the received request and causes the data processing unit 365 to perform the processing requested from the scanned document processing server 121.

Upon completion of the requested processing, the business server 131 returns a response to the scanned document processing server 121. In step S418, the scanned document processing server 121 notifies the operating user about the result of the completion.

Through the above-described operation, the user can preview the document scanned by the user, and store the document into the scanned document processing server 121 and the business server 131.

As described above, using two types of fixed images, namely, the fixed image corresponding to one sheet and the fixed image corresponding to the plurality of sheets makes it possible to display the preview screen that enables the user to easily understand and grasp the image data. In a case where a plurality of sheets of a document is scanned, the fixed image is displayed in place of the image data to be obtained by an additional scan, which enables the user to perform an operation, such as page change, on the preview screen without waiting for completion of the processing for generating the image data. As a result, the user can smoothly perform the operation. In particular, in a case where a fourth or subsequent sheet of the document is scanned, update of the screen is unnecessary, which enables the user to continuously operate the preview function, such as a preview check.

For the image of the page currently being checked, the fixed image is assumed to be replaced by the image data after the completion of the imaging processing. On the other hand, a preview of the pages before and after the page currently being checked is assumed to be displayed by constantly using the fixed images as described above, in order to reduce a load in operation of the preview screen.

In the above description, the configuration in which a fixed image is displayed in place of image data during image data generation after scan processing is mainly described. Alternatively, a fixed image may be temporarily displayed while editing processing on image data is performed in the preview processing in step S410. An operation, such as page change, may be performable also on the preview screen on which a fixed image is displayed at the center as the page currently being checked.

Figure 7:
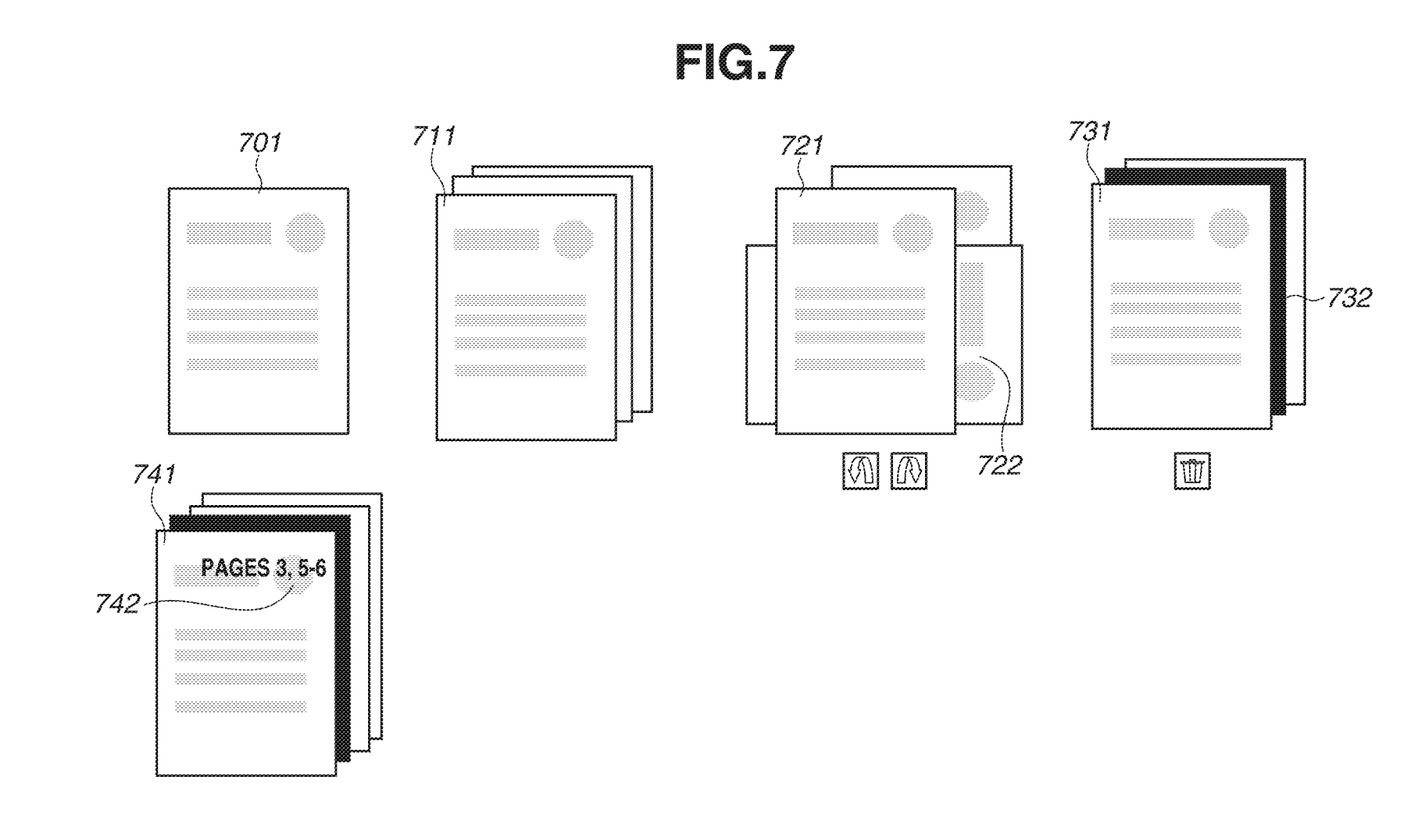
FIG. 7 is a diagram illustrating examples of an image displayed on the preview screen according to one or more aspects of the present disclosure.

FIG. 7 illustrates other examples of the fixed images 542 and 553 indicating the pages before and after the page currently being checked on the preview screen. Fixed images 701 to 741 illustrated in FIG. 7 are each associated with the content edited by the user using the control 571 (the preview editing function) and/or the scan settings set by the user using the settings buttons 504 and 505. Each of the fixed images 701 to 741 illustrated in FIG. 7 is a fixed image to which the edited content and/or the scan settings are applied. The fixed images 701 to 741 illustrated in FIG. 7 may be used and displayed as the fixed images 542 and 553 indicating the pages before and after the page currently being checked on the preview screen. This makes it possible to indicate where in the pages before and after the page currently being checked the data edited by the user or the data scanned with a specific setting is present. The fixed images 701 to 741 are merely examples, and images may be displayed in association with other editing functions or other scan settings.

The fixed image 701 is a basic fixed image displayed on the preview screen, and is used as each of the fixed images 532, 553, and 603. Using the fixed image 701 as each of the fixed images 532, 553, 603, and the like on the preview screen indicates that there is one page before or after the page currently being checked.

The fixed image 711 is a fixed image including a plurality of the fixed images 701. Using the fixed image 711 as each of the fixed images 542 and 553 indicating the pages before and after the page currently being checked on the preview screen indicates that there are two or more pages before the page currently being checked and there are two or more pages after the page currently being checked. In the present example, the fixed image 711 in which three sheets are superimposed is illustrated, but an image in which two sheets are superimposed may be used like the fixed image 542 in FIGS. 4E and 4F. In the present exemplary embodiment, in a case where there are two or more pages before or after the page currently being checked, one type of fixed image like the fixed image 711 or the fixed image 542 is used irrespective of the number of pages. However, the present exemplary embodiment is not limited thereto. An image in which sheets corresponding to the actual number of pages before or after the page currently being checked are superimposed may be displayed. More specifically, in a case where there are two pages before or after the page currently being checked, the fixed image 542 may be displayed, and in a case where there are three pages before or after the page currently being checked, the fixed image 711 may be displayed.

The fixed images 721, 731, and 741 correspond to cases where an image in which sheets corresponding to the actual number of pages before or after the page currently being checked are superimposed is displayed. The fixed image 721 indicates that there are three pages before or after the page currently being checked, and also indicates that these pages include a page 722 to which the rotation function corresponding the button 572 (the left rotation button) or the button 573 (the right rotation button) has been applied. Depending on the amount of the rotation, the fixed image 721 to be displayed may be rotated. The page 722 may also be used and displayed in a case where a document is scanned horizontally based on the scan settings.

The fixed image 731 indicates that the document includes a page 732 to which a deletion function corresponding to the button 574 has been applied. In a case where a page is deleted, the deleted page is typically hidden. However, the present exemplary embodiment deals with a case where the deletion function in which the deletion can be canceled by pressing of the same button again is assumed and applied.

The fixed image 741 displays information 742 indicating the number of pages before or after the page currently being checked, thereby presenting information about the number of pages before or after the page currently being checked in an easier-to-understand manner. The fixed image 741 may be combined with the fixed image 731 to display only the number of pages to be transmitted.

According to the present exemplary embodiment, it is possible to intelligibly provide information about image data obtained by scans to the user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-181541, filed Nov. 14, 2022, which is hereby incorporated by reference herein in its entirety.

What is claimed is:

1. An image processing apparatus comprising:
one or more memories storing instructions; and
one or more processors executing the instructions to
display a scanned image obtained by scanning a first page of a document;
in a state where the scanned image is displayed, based on a first user instruction to scan a second page of the document, display, on a right side of the scanned image, a first illustration representing one sheet of paper; and
in a state where the scanned image and the first illustration representing the one sheet of paper are displayed, based on a second user instruction to scan a third page of the document, change an illustration displayed on the right side of the scanned image from the first illustration to a second illustration representing a plurality of sheets of paper,
wherein in a state where the scanned image and the second illustration representing the plurality of sheets of paper are displayed, based on a third user instruction to scan a fourth or subsequent page of the document, the illustration displayed on the right side of the scanned image is not changed from the second illustration.

2. The image processing apparatus according to claim 1, wherein, based on the first user instruction to scan the second page of the document the first illustration is displayed regardless of completing scanning the second page.

3. The image processing apparatus according to claim 1, wherein after the first user instruction to scan the second page of the document, an editing instruction for the scanned image is received regardless of completing scanning the second page.

4. The image processing apparatus according to claim 1, wherein in a state where the first, second and third pages of the document are scanned and the scanned image and the second illustration are displayed, a change instruction is received to change a page of the document corresponding to the displayed scanned image from the first page to the second page, and
wherein, based on the received change instruction, the scanned image is changed from the scanned image obtained by scanning the first page of the document to another scanned image obtained by scanning the second page of the document, and the first illustration representing the one sheet of paper is displayed on the right side of said another scanned image.

5. The image processing apparatus according to claim 1, wherein, in a state where the first, second, third and fourth pages of the document are scanned and the scanned image and the second illustration are displayed, a change instruction is received to change a page of the document corresponding to the displayed scanned image from the first page to the second page, and
wherein, based on the received change instruction, the scanned image is changed from the scanned image obtained by scanning the first page of the document to another scanned image obtained by scanning the second page of the document, and the second illustration representing the plurality of sheets of paper continues to be displayed on the right side of said another scanned image.

6. The image processing apparatus according to claim 4, wherein, based on the change instruction, the first illustration representing the one sheet of paper is displayed on a left side of said another scanned image, and
wherein the first illustration displayed on the left side of said another scanned image is the first illustration edited based on an editing instruction to edit the scanned image.

7. The image processing apparatus according to claim 1, wherein, until imaging processing on the scanned image corresponding to the first page is completed, the first illustration is displayed in place of the scanned image.

8. The image processing apparatus according to claim 1, wherein, as an editing instruction for the displayed scanned image, an instruction to perform at least one of rotation, deletion, and insertion of the scanned image is received.

9. A method for controlling an image processing apparatus, the method comprising;
displaying a scanned image obtained by scanning a first page of a document;
displaying on a right side of the scanned image a first illustration representing one sheet of paper, in a state where the scanned image is displayed, based on a first user instruction to scan a second page of the document; and
changing an illustration displayed on the right side of the scanned image from the first illustration to a second illustration representing a plurality of sheets of paper, in a state where the scanned image and the first illustration representing the one sheet of paper are displayed, based on a second user instruction to scan a third page of the document,
wherein in a state where the scanned image and the second illustration representing the plurality of sheets of paper are displayed, based on a third user instruction to scan a fourth or subsequent page of the document, the illustration displayed on the right side of the scanned image is not changed from the second illustration.

10. A non-transitory computer-readable storage medium that stores a computer program for causing a computer to perform a method for controlling an image processing apparatus, the method comprising;
displaying a scanned image obtained by scanning a first page of a document;
displaying on a right side of the scanned image a first illustration representing one sheet of paper, in a state where the scanned image is displayed, based on a first user instruction to scan a second page of the document; and
changing an illustration displayed on the right side of the scanned image from the first illustration to a second illustration representing a plurality of sheets of paper, in a state where the scanned image and the first illustration representing the one sheet of paper are displayed, based on a second user instruction to scan a third page of the document,
wherein in a state where the scanned image and the second illustration representing the plurality of sheets of paper are displayed, based on a third user instruction to scan a fourth or subsequent page of the document, the illustration displayed on the right side of the scanned image is not changed from the second illustration.

* * * * *